United States Patent [19]
Schmidt et al.

[11] 3,812,244
[45] May 21, 1974

[54] PREPARATION OF ALUMINUM HYDRIDE

[75] Inventors: Donald L. Schmidt, Midland; Arthur L. Daniels, Coleman; Ronald V. Petrella, Midland, all of Mich.

[73] Assignee: The Dow Chemical Company, Midland, Mich.

[22] Filed: Mar. 22, 1966

[21] Appl. No.: 538,170

Related U.S. Application Data

[63] Continuation-in-part of Ser. No. 414,052, Nov. 20, 1964, abandoned.

[52] U.S. Cl. ............................................... 423/645
[51] Int. Cl. .............................................. C01b 6/00
[58] Field of Search ................. 23/204, 14; 423/645

[56] References Cited
UNITED STATES PATENTS

| | | | |
|---|---|---|---|
| 2,468,260 | 4/1949 | Gibb | 23/204 X |
| 3,567,972 | 9/1951 | Schlesinger | 23/204 X |
| 3,076,047 | 1/1963 | Seubold | 23/204 X |

FOREIGN PATENTS OR APPLICATIONS

| | | | |
|---|---|---|---|
| 589,731 | 12/1959 | Canada | 23/204 |
| 785,348 | 10/1957 | Great Britain | 23/204 |

OTHER PUBLICATIONS

Gaylord –"Reduction with Complex Metal Hydrides", Interscience Publishers, Inc., N.Y., 1956, pp. 6–8, 76, 51, 54, 71, and 72.

Wood et al., J. Electrochem. Soc., Vol. 104, pp. 29 to 37 (1957)

*Primary Examiner*—Leland A. Sebastian
*Attorney, Agent, or Firm*—C. Kenneth Bjork

[57] ABSTRACT

A novel method for preparing metal hydrides, particularly aluminum hydride and aluminum halohydrides, by the direct reaction of a metal hydride with a metal chloride. In one embodiment carrier liquids which are a non-solvent for the metal hydride reactant can be employed.

2 Claims, No Drawings

PREPARATION OF ALUMINUM HYDRIDE

This application is a continuation-in-part of application Ser. No. 414,052 filed Nov. 20, 1964, now abandoned.

This invention relates to the preparation of light metal hydrides and more particularly is concerned with a novel process for preparing aluminum hydrides, i.e. aluminum hydride and aluminum halohydrides, such as for example aluminum chlorohydrides and aluminum bromohydrides.

Heretofore, in the preparation of light metal hydrides such as aluminum hydrides complex metal hydrides, e.g., lithium aluminum hydride, sodium borohydride and lithium borohydride, which are soluble in the ethereal solvent employed in the process have been required to assure operability of the process.

Now, unexpectedly the present process provides a novel method for preparing light metal hydrides, particularly aluminum hydride and aluminum halohydrides using as a starting material metal hydrides which are substantially insoluble in organic vehicles employed as a carrier in the process and therefore inoperable in conventional solvent processes for preparing such hydrides.

It is a principal object of the present invention to provide a novel, direct process for preparing light metal hydrides, particularly aluminum hydride.

It is also an object of the present invention to provide a novel process for preparing aluminum hydrides, i.e., aluminum hydride and aluminum halohydrides employing hydride reactants which are inoperable in the presently known conventional solution processes.

It is a further object of the present invention to provide a novel process for preparing metal hydrides, particularly aluminum hydrides, which is simple, requires a minimum of equipment and proceeds readily without a multiplicity of handling and processing steps.

It is also an object of the present invention to provide a novel process for preparing light metal hydrides which does not employ or require ether as a solvent or reaction carrier.

These and other objects and advantages readily will become apparent from the detailed description presented hereinafter when read in conjunction with the appended claims.

In accordance with the present invention, generally a metal hydride corresponding to the formula $M_1{}^m H_m$ or $M_1{}^m M_2{}^n (H)_{m+n}$ wherein $M_1$ is an alkali metal or alkaline earth metal, $M_2$ is an earth metal and $m$ and $n$ are the valences of the respective members $M_1$ and $M_2$, is contacted for a period of time under agitation with aluminum chloride or beryllium chloride or -bromide or a complex alkali metal aluminum chloride or -bromide or a complex alkali metal beryllium chloride or -bromide and an aluminum hydride or beryllium hydride product recovered therefrom. The present process is particularly suitable for preparing aluminum hydride, aluminum chlorohydrides and aluminum bromohydrides.

More particularly, in practicing a preferred embodiment of the present invention, a metal hydride such as, for example, sodium hydride (NaH), lithium hydride (LiH), magnesium hydride (MgH$_2$), calcium hydride (CaH$_2$), sodium aluminum hydride (NaAlH$_4$) and the like is mixed with a substantially anhydrous reactant, such as aluminum chloride, aluminum bromide, sodium aluminum chloride, potassium aluminum chloride, and the like to provide a reaction mixture which at a minimum (based on metal hydride reactant) contains about stoichiometric quantities of the reactants based on the conversion to the aluminum hydride product. Ordinarily the reaction mixture contains from about 10 to about 50 weight per cent excess of the metal hydride reactant required stoichiometrically for reaction with the aluminum halide reactant. The maximum amount of metal hydride reactant to be utilized is not critical except that ordinarily this is limited to those quantities which give readily handled reaction mixtures.

The reaction mixture is agitated to provide intimate contact of the reactants as by grinding or high speed stirring for an extended period of time. Conveniently, ball mill and rod mill grinding for a period of from about 12 to about 72 hours or more is employed. The actual time of grinding for a given system is determined by the efficacy of operation of the system. Ordinarily, the agitation process is carried out at about room temperature, (i.e., about 18°–25° C.) although higher or lower temperatures can be employed.

Usually the process is carried out at autogeneous pressure in a sealed reactor although if desired the reactor can be vented to assure no undesirably high build-up of any generated pressure.

The aluminum hydride product readily is recovered from the solid reaction mixture by extraction into an alkyl ether solvent, for example diethyl ether.

In a preferred embodiment for preparing aluminum hydride and aluminum chlorohydrides by the present novel process, magnesium hydride is reacted with a substantially anhydrous aluminum chloride or a substantially anhydrous aluminum chloride-sodium chloride-potassium chloride eutectic having the following composition, aluminum chloride-66 per cent; sodium chloride-20 mole per cent and potassium chloride-14 mole per cent. The eutectic is particularly effective as an aluminum source in that it is low melting, (melting at about 80° C.) and has strong solubilizing characteristics both of which serve to promote the reaction.

The present process proceeds satisfactorily by direct reaction of the reactant members as set forth hereinbefore. However, if desired a liquid vehicle or carrier which is inert to the reactants or products can be employed. The amount of such a carrier, at a maximum, to be used is that ordinarily employed in grinding or other solid body contact reactions. The use of a liquid carrier offers the advantage that it aids in elimination of balling of the composition as sometimes is encountered with dry mixes. Further, the liquid provides a heat sink which is useful as a means for temperature control. Substantially anhydrous liquid aromatic, alicyclic and aliphatic hydrocarbons such as n-heptane, octane, benzene, toluene, xylene and the like have been found to be particularly suitable as carriers. Other relatively non-polar liquids inert to the reactant mixture or products also can be used.

Incorporation of a small amount from about 1 to about 5 weight per cent based on the total mass of a reaction promoter, such as a magnesium dialkyl compound, for example into the reaction mixture has been found to favorably increase the kinetics of the reaction.

Also, particularly with ball mill operation the addition of a quantity of mercury, from about 1 to about 20 weight per cent based on the total reaction mass has been found to improve the stability of the reactants and products against autodecomposition during the reaction process. The mercury does not enter into or detrimentally affect the desired reaction and readily is separated for the reaction products.

Further, introduction of trace quantities of sodium borohydride ($NaBH_4$) into the reactant mixture has been found to increase the stability against atmospheric and thermal degradation of the product. It is believed this results by reaction with iron contaminants as are present in most of the reactants generally employed.

Ordinarily the process is carried out in a ball mill using corundum, steel, aluminum oxide, flint or the like balls as a grinding medium. Corundum balls are preferred. The ball mill itself can be of steel, earthenware, Teflon fluorocarbon or the like. The latter material is particularly suitable in that it is highly wear resistant while being resilient. This resiliency provides for introduction of only a minimum of impurities into the reaction mass from the balls as they strike the wall of the mill as compared with harder mill wall materials.

The resulting product solution, i.e. ether extract of the light metal hydride product can be used directly as a starting material in the production of other hydrides, or as a reducing agent, or if desired, the product, e.g., aluminum hydride or beryllium hydride, can be recovered therefrom.

The following Examples will serve to further illustrate the present invention but are not meant to limit it thereto.

EXAMPLE 1

Aluminum chloride, sodium chloride and potassium chloride were mixed together in quantities to provide, on a mole per cent basis, the eutectic $AlCl_3$—66%/NaCl—20%/KCl—14%. Finely divided magnesium hydride (about 5 grams) and about 15 grams of the eutectic were admixed in a substantially anhydrous nitrogen atmosphere, placed in a closed vessel and agitated with a magnetic stirrer at a temperature of about 90° C. for about 30 minutes.

After the reaction period, the product mass was extracted with about 500 cubic centimeters of diethyl ether and the resulting extract separated from the residual product mass.

The ether was removed from the extract leaving a viscous liquid product.

Infrared analysis of this liquid product showed relatively sharp absorption bands at about 5.2 and 6.1 microns indicative of Al-H bonds.

Elemental analysis of the product indicated C—19.21%, H—4.19%, Al—12.40%, Mg—1.78%, Cl—50.8%. This analysis indicates an aluminum chlorohydride etherate having an Al/Cl gram-atom ration of approximately 2.

EXAMPLE 2

Substantially anhydrous, particulate aluminum chloride (~ 10 grams), particulate magnesium hydride (~5 grams) and 0.5 gram of diethyl magnesium were mixed with about 25 cubic centimeters of n-pentane and 75 cubic centimeters of benzene as a carrier and this mixture stirred in a high speed Waring blender for about 7 hours. During this time, the reaction temperature rose from room temperature to about 50° C. and remained there as the solvent system refluxed. Following the reaction period, the hydrocarbon carrier was removed by evaporation and the resulting solid product mixture washed with diethyl ether. The ether solution was then separated from residual solids and the solid residue analyzed by X-ray diffraction. The X-ray diffraction indicated about 60–70 per cent magnesium chloride, about 5 aluminum and about 30–40 per cent magnesium hydride.

The ether solvent was removed under a reduced pressure from the extracted product. The resulting solid product was a white powder. X-ray diffraction indicated this to be an aluminum hydride etherate. The infrared spectrum showed a sharp absorption band at about 5.2 microns and a broad absorption band extending from about 6 to about 6.5 microns indicative of Al—H bonds. Elemental analysis showed C—25.8 per cent, H-7.03%, Al-24.89% and Cl-33.4%. This indicated an aluminum chlorohydride etherate having an Al/Cl ratio of about 1 (gram-atom basis).

This run was repeated using the same procedure and apparatus except that about 2.5 grams sodium hydride was used as the metal hydride source replacing the magnesium hydride. The product recovered from the diethyl ether extract as identified by infrared analysis was substantially the same as that obtained for the run using the magnesium hydride.

EXAMPLE 3

Resublimed aluminum chloride (~10 grams) and magnesium hydride (~5 grams) were mixed with about 50 cubic centimeters of xylene. This mixture was placed in a Teflon tetrafluoroethylene resin cylindrical ball mill about 5 inches in diameter by about 10 inches high. Corundum cylinders about 0.75 inch in diameter and about 1 inch high occupied from about 60 to about 70 per cent of the total volume of the mill.

The reaction mixture was ball milled under a substantially anhydrous nitrogen atmosphere at room temperature for about 24 hours.

Following the reaction period, the solid product mass was separated from the organic carrier and extracted with diethyl ether. The final product recovered from the ether extract gave an infrared spectrum corresponding to the aluminum hydride etherate described in Example 2.

This preparation was repeated utilizing the same reactants, concentrations and procedure except that about 0.1 gram of diethyl magnesium was incorporated into the initial reaction mixture. In this run, analysis of an ether extract of the product for a given reaction period indicated that the rate of aluminum hydride formation was increased by a factor of at least about 3 over the run without the magnesium dialkyl reactant.

EXAMPLE 4

About 10 grams of sodium aluminum hydride ($NaAlH_4$), about 5 grams aluminum chloride ($AlCl_3$) and about 40 cubic centimeters of xylene were ball-milled for about 70 hours in the Teflon tetrafluoroethylene resin ball mill described in Example 3. After this time, the solid product mass was separated from the xylene carrier. This product was extracted with diethyl ether, the ether extract separated from residual solids and the ether removed from the resulting product solution under a reduced pressure. The resulting solid product had an infrared spectrum for aluminum hydride etherate corresponding to the emperical formula $AlH_3 \cdot x(C_1H_5)_2O$. Also chemical analysis showed carbon-12.0 percent, hydrogen-9.4 percent, aluminum- 68.6 percent with substantially no chloride (<0.1 percent) present in the final product.

EXAMPLE 5

Aluminum (20 grams, ~0.075 mole) was ball-milled in about 50 cubic centimeters n-heptane with 5 grams of magnesium hydride (~0.192 gram mole) for about 48 hours. The solid product mass was separated from the n-heptane carrier and extracted with ether. The product recovered from the ether extract after removing the ether therefrom upon infrared analysis showed the presence of aluminum-hydrodgen bonds.

Analysis of this product indicated H-2.19 percent, C-7.87 percent, Al-8.21 percent, Mg-8.77 percent, Br-69.60 percent. When the magnesium present is accounted for as magnesium bromide ($MgBr_2$), the resultant Al/Br ratio is found to be about 2. This indicated the product to be an aluminum bromohydride etherate.

EXAMPLE 6

About 27.2 grams of a particulate aluminum chloride (~0.20 gram mole) was mixed with about 8.0 grams (~0.30 gram mole) of magnesium hydride in about 100 milliliters of xylene (which had been dried over molecular sieves) under a substantially anhydrous nitrogen atmosphere in a Teflon tetrafluoroethylene resin bottle of about 2.5 inches diameter by about 6 inches high and having a volume of about 500 cubic centimeters. Ceramic balls of about 0.5 inch diameter were placed in the bottle. The reactor was sealed and placed on a shaker and the reaction mixture ground for about 96 hours.

The xylene was removed from the resulting particulate solid product mass and this mass was extracted with about 500 milliliters diethyl ether. The ether extract was separated from the residual solids.

X-ray diffraction analysis of the residual solids after the ether extract indicated $MgCl_2$ about 30–40 percent, $MgCl_2 \cdot H_2O$ about 30–40 percent, $MgH_2$ about 10–20 percent and Al only about 10–20 percent thus indicating good conversion to the desired aluminum hydride with relatively small amount of decomposition during the reaction period.

The ether solution was titrated with standardized silver nitrate solution to determine soluble chloride, i.e., formation of aluminum chlorohydride. This analysis showed 94 millimoles of chloride indicating about 84 per cent conversion of the aluminum chloride reactant.

The ether was removed from the ethereal product extract. Infrared absorption spectrum of the product showed aluminum-hydrogen bonds indicative of an aluminum hydride etherate. Elemental analysis gave C-25.10%, H-7.62%, Al-30.10%, Cl-27.00%, Mg-0.2%. This was indicative of an aluminum chlorohydride etherate having an Al/Cl ratio of about 1.45 (gram-atom basis).

EXAMPLE 7

In a study preparing aluminum hydrides by following the procedure set forth in the preceding Example but using iron contaminated reactants, decomposition of the products, as evidenced from gassing, readily occurs.

By incorporating trace quantities, i.e., about 0.1 weight per cent, based on the total weight of reactants, of sodium borohydride into the reaction mixture, the resulting aluminum hydride product exhibits a marked increase in stability against spontaneous decomposition.

EXAMPLE 8

A number of thermal studies were carried out employing various reactants in accordance with the teachings of the present process. All of these on the basis of free energies of formation ($\Delta F°$ at ~298° K) show the operability of the present invention. These runs are summarized as follows.

| | | | Net Change $\Delta F$ Kcal. |
|---|---|---|---|
| 1. | $BeCl_2(c)+MgH_2(c)$ | $\rightarrow MgCl_2(c)+BeH_2(c)$ | −26.41 |
| | −106.1    −8.8 | −141.4    +0.09 | |
| 2. | $BeCl_2(c)+2NaH(c)$ | $\rightarrow BeH_2(c)+2NaCl(c)$ | −61.81 |
| | −106.1   2(−8.0) | 0.09    2(−92) | |
| 3. | $3NaAlH_4(c)+AlCl_3(c)$ | $\rightarrow 4AlH_3(c)+3NaCl(c)$ | −21 |
| | 3(−20)    −151 est. | (11)4+3(−92) | |
| 4. | $3CaH_2(c)+2AlCl_3(c)$ | $\rightarrow 2AlH_3(c)+3CaCl_2(c)$ | −96.72 |
| | 3(−35.8)   2(−150.7) | 2(11.19)   3(−179.3) | |
| 5. | $3LiAlH_4(c)+AlCl_3(c)$ | $\rightarrow 4AlH_3(c)+3LiCl(c)$ | −45.23 |
| | 3(−11.56)  −150.7 | 4(11.19)   3(−91.79) | |
| 6. | $3NaH(c)+NaAlCl_4(c)$ | $\rightarrow AlH_3(c)+4NaCl(c)$ | −84 |
| | 3(−8.0)   (−249) | (11)    4(−92) | |
| 7. | $3MgH_2(c)+2KAlCl_4(c) \rightarrow$ | | −63.8 |
| | 3(−8.6)   2(−254) | | |
| | $2AlH_3+2KCl(c)+3MgCl_2(c)$ | | |
| | 2(11)    2(−98) | | |

Various modifications can be made in the present invention without departing from the spirit or scope thereof for it is understood that we limit ourselves only as defined in the appended claims.

We claim:

1. A process for preparing aluminum hydride which comprises:
   a. grinding in a ball mill at about room temperature magnesium hydride with an aluminum chloride reactant, said aluminum chloride reactant being in the form of an aluminum chloride-sodium chloride-potassium chloride eutectic having a composition of about 66 mole per cent aluminum chloride, about 20 mole per cent sodium chloride and about 14 mole per cent potassium chloride, the quantity of said magnesium hydride in the reaction mixture ranging from about stoichiometric to about 50 weight per cent excess of that required for reaction with the aluminum chloride of said aluminum chloride reactant,
   b. grinding the reaction mixture for an extended period of time of from about 12 to about 72 hours, and
   c. extracting the resulting product mixture with an alkyl ether, dissolving the aluminum hydride product in said alkyl ether and separating the resulting aluminum hydride product solution from residual solids.

2. A process for preparing aluminum hydrides which comprises:

a. admixing an aluminum chloride reactant and magnesium hydride in an amount about stoichiometric of that required to react completely in the preparation of aluminum hydrides, said aluminum chloride being supplied from an aluminum chloride-sodium chloride-potassium chloride eutectic having a composition of about 66 mole per cent aluminum chloride, about 20 mole per cent sodium chloride and about 14 mole per cent potassium chloride, b. grinding said mixture in a ball mill for at least about 12 hours at about room temperature, c. extracting the solid product mixture with diethyl ether, d. separating the resulting ether extract from residual solids, and e. removing the diethyl ether from the ether extract thereby recovering aluminum hydrides from said diethyl ether extract.

* * * * *